UNITED STATES PATENT OFFICE.

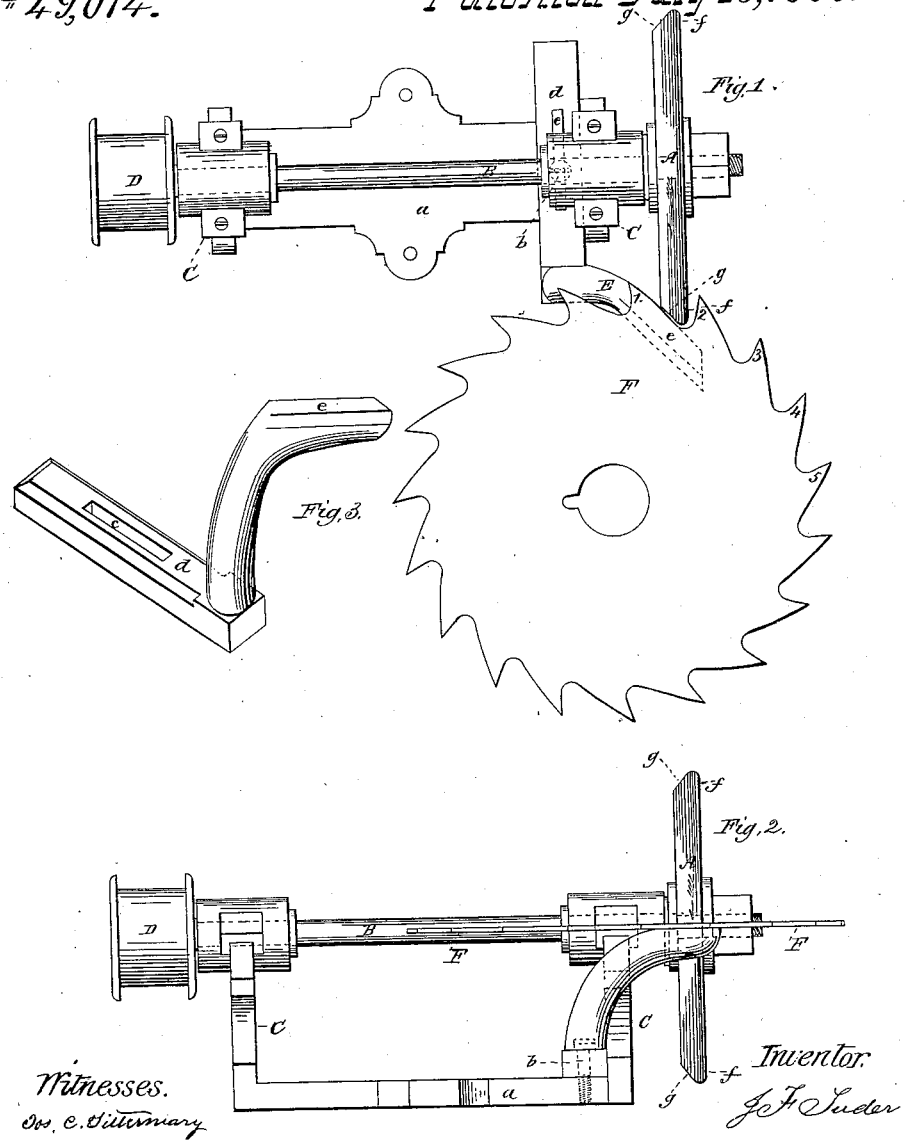

JOSEPH F. TUDER, OF PHILADELPHIA, PENNSYLVANIA.

IMPROVED MODE OF SHARPENING SAWS.

Specification forming part of Letters Patent No. 49,014, dated July 25, 1865.

*To all whom it may concern:*

Be it known that I, JOSEPH F. TUDER, of the city and county of Philadelphia, and State of Pennsylvania, have invented a new and Improved Mode of Sharpening Saws; and I do hereby declare that the following is a full, clear, and exact description of the construction and operation of the same, reference being had to the annexed drawings, making a part of this specification, in which—

Figure 1 is a plan or top view of an emery-wheel, A, and parts with which it is connected, and a saw in position to be sharpened. Fig. 2 is a side elevation of the same. Fig. 3 is a perspective view of the rest E.

Like letters in all the figures represent the same parts.

The nature of my invention and improvement consists in the use of solid emery-wheels in the place of files for sharpening saws, arranged and operating as follows:

I use a solid emery-wheel, A, of such form on its periphery as will correspond in its general features to the serrations which form the teeth of the saw. I place the said wheel on a mandrel, B, which is situated in the head C, and is made to revolve with great velocity by means of a belt connecting the pulley D with a driving-pulley of the motive power. E is a rest on which the saw F is held to be sharpened, the said rest being confined to the bed-plate *a* of the head C by means of a screw, *b*, which passes through the slot *c* of the bed-piece *d* of the rest. The rest is shown in detail in Fig. 3. When the teeth are to be sharpened straight across, the arm *e* of the rest is but a trifle lower than the center of the mandrel B, so as to bring the middle of the periphery of the saw-plate on a line with the center of the mandrel; but when the edges of the teeth are to be beveled the rest should be constructed or adjusted to correspond; or the saw may be canted to effect the same object by an experienced workman, with the rest in the position represented.

In sharpening saws whose teeth have a similar construction to those represented in the drawings the operation is as follows: The front edge of tooth No. 1 is brought against the level or flat side *f* of the emery-wheel A, which revolves with a high velocity in the direction of the arrow, and then the front edge of tooth No. 2 is sharpened in the same way. The saw is then moved in such a manner as to bring the back edge of the tooth No. 1 against the bevel part *g* of the wheel. Then the front edge of tooth No. 3 is brought against the wheel in like manner, as before explained, and then the back edge of the tooth No. 2, and so on in succession until the last tooth is sharpened.

With my mode of sharpening saws, as above explained, a vast amount of time and expense is saved over the usual mode of sharpening with files.

What I claim as new, and desire to secure by Letters Patent, is—

The combination of the devices, constructed and arranged substantially as herein described, for sharpening the teeth of saws.

In testimony that the above is my invention I have hereunto set my hand and affixed my seal this 1st day of March, 1865.

JOS. F. TUDER. [L. S.]

Witnesses:
 JOS. C. TITTERMARY,
 STEPHEN USTICK.